United States Patent [19]

Grove

[11] Patent Number: 4,884,595

[45] Date of Patent: Dec. 5, 1989

[54] FLOW CONTROL DEVICE

[75] Inventor: Lee A. Grove, Elkhart, Ind.

[73] Assignee: Remote Controls, Inc., Mishawaka, Ind.

[21] Appl. No.: 341,474

[22] Filed: Apr. 21, 1989

[51] Int. Cl.⁴ .................. F16K 11/18; F16L 55/14
[52] U.S. Cl. ................... 137/636.1; 137/72; 251/5; 251/9
[58] Field of Search .............. 251/4, 5, 6, 7, 8, 9, 251/10, 61.1; 137/72, 79, 80, 636, 636.1; 604/250

[56] References Cited

U.S. PATENT DOCUMENTS

| 114,981 | 5/1871 | Shoenberger | 251/4 |
|---|---|---|---|
| 2,572,658 | 10/1951 | Perkins | 251/4 |
| 2,791,239 | 5/1957 | Mason | 251/9 |
| 3,016,915 | 1/1962 | Moeller, Jr. | 137/636.1 |
| 3,044,433 | 7/1962 | Guta | 137/454.2 |
| 3,049,088 | 8/1962 | Curtis | 114/197 |
| 3,075,551 | 1/1963 | Smith et al. | 251/7 |
| 3,223,116 | 12/1965 | Criddle | 251/5 |
| 3,292,718 | 12/1966 | Stone | 251/5 |
| 3,479,001 | 11/1969 | Dower | 251/4 |
| 3,496,022 | 2/1970 | Lit | 137/72 |
| 3,556,139 | 1/1971 | Yalovega | 251/61.1 |
| 4,109,423 | 8/1978 | Perrain | 251/7 |
| 4,143,671 | 3/1979 | Olson | 137/72 |
| 4,328,834 | 5/1982 | Oates, Sr. et al. | 137/636.1 |
| 4,683,907 | 8/1987 | Brugnoti | 251/5 |

FOREIGN PATENT DOCUMENTS 1327533 12/1968 France .

Primary Examiner—George L. Walton
Attorney, Agent, or Firm—Barnes & Thornburg

[57] ABSTRACT

A flow control device has a body with side walls which define a fluid holding chamber, an inlet for allowing fluid to enter the chamber, and at least one outlet for allowing fluid to exit the chamber. A length of collapsible tubing is sealingly attached to each outlet and extends into the fluid holding chamber. A mechanical device is provided for selecting collapsing the tubing at a point which is spaced apart from the side walls of the chamber. When the tubing is collapsed at this point, the downstream pressure in the outlet decreases and the pressure of the fluid in the chamber causes the tubing between the location of the mechanical device and the side walls to collapse. The tubing is formed from a material having a durometer hardness rating selected on the basis of a fluid characteristic or on the basis of a characteristic of particle carried in the fluid. In the latter case, the tubing is selected to the soft enough to encapsulate and seal around particles in the collapsed seal area of the tubing. To open the valve, the mechanical device releases the tubing and the pressure of the fluid in the chamber causes the tubing to return to an uncollapsed state. One embodiment of the device has an arrangement for automatically opening the outlets when the temperature of the body increases beyond a predetermined level.

22 Claims, 3 Drawing Sheets

FLOW CONTROL DEVICE

BACKGROUND AND SUMMARY OF THE INVENTION

The present invention relates generally to flow control devices, and more particularly to devices, such as valves, which are well-suited for controlling the flow of liquids, gases, slurries, suspensions, mixtures and other fluid or fluidized streams, collectively referred to below as "fluids" or "media". Devices constructed in accordance with the present invention are especially well-suited for controlling the flow of a fluid or medium which is contaminated with, or which includes by design, sand, sediments, and/or other solid particulate matter having abrasive properties.

A variety of valves suitable for controlling the flow of liquid and gaseous fluids are available. Such valves typically incorporate sealing surfaces or elements which may include diaphragms, O-rings, pistons, disks or specially machined tapered seats. The ability of such devices to function properly when exposed to sediment, sand, dirt, metal chips or other particles in the fluid flow varies with specific design parameters and operating conditions, but in general is not good. Such contaminants tend to clog, score, or otherwise damage sealing surfaces in the valves, leading to degradations in performance, or outright failures, of the valves.

One particular application for valves in which the above problems have been identified relates to large, ocean going vessels, and particularly to navel warships. Warships are typically provided with sprinkler systems which are intended to dowse fires in or around the ship's magazine, fuel supply, and other installations. Such ships may also be provided with wash-down systems which are used in decontaminating surfaces which have been exposed to chemical clouds, radioactive fallout, or other hazards. Water to supply such systems is generally drawn from the sea through one or more large water inlets located below the water line of the ship. Sea water may also be drawn in through these or other inlets to provide water for use in maintenance, cooling and other applications where clean, fresh water is not required. Although these inlets may be provided with strainers to keep out seaweed and other large objects, sand, sediments, and other smaller contaminants are often drawn into these systems. This is particularly true when the ship is required to sail or dock in relatively shallow waters or harbors.

Accordingly, a need exists for valves which can control the flow of media which may be contaminated with sand, sediments, or other solid particulate matter. It is an object of the present invention to provide such valves.

Another object of the present invention is to provide a flow control device which is relatively simple and inexpensive to manufacture and maintain, and which is very reliable in operation.

Yet another object of the present invention is to provide a flow control device which is suitable for use in a fire control system, and which is provided with a feature which allows the device to automatically open or operate when the temperature of the device increases beyond a predetermined temperature value.

These and other objects of the present invention are attained in a flow control device which comprises a body having side walls which define a fluid holding chamber, at least one inlet opening into the chamber, at least one outlet opening into the chamber and having an outlet opening in the valve body, collapsible tubing means sealingly attached to the outlet opening and extending into the chamber, and means for selectively collapsing and uncollapsing the tubing means to block and unblock the flow of fluid from the chamber through the outlet opening. The means for collapsing the tubing means preferably comprises a mechanical device disposed adjacent the tubing means at a first location spaced apart from the side walls of the chamber. The fluid or media flow enters the chamber under a positive pressure. When the mechanical device collapses the tubing at the first location, the pressure of the surrounding fluid in the chamber exerts a collapsing force on that portion of an outer surface of the tubing means between the mechanical device and the side wall of the chamber, causing that portion of the tubing means to collapse. The mechanical device may comprise a camming device and an operator for the camming device, such as a handle and a shaft which extends through the side wall of the chamber. In one embodiment, the valve includes at least two outlets, each having collapsible tubing means attached thereto. In this embodiment, both tubing means are commonly collapsed by operation of a single camming device.

One embodiment of the mechanical device further includes a pair of closure members oppositely disposed on either side of the tubing means. At least one of the members is movably mounted and situated adjacent a camming surface of the camming device. The movable members cooperate with the camming device to collapse the tubing means when the camming device is operated.

One means for uncollapsing the tubing means comprises pressure exerted by the fluid or media on an inner surface of the tubing means. When the mechanical device is moved to a position which does not collapse the tubing means at the first location, the pressure of the fluid or media in the chamber causes the tubing means to return to an uncollapsed (open) condition. The tubing means may be formed from a natural or synthetic rubber, or a functionally equivalent material, having a durometer hardness rating which is selected on the basis of at least one characteristic (such as specific gravity, viscosity, etc.) of a fluid flow controlled by the device. In one embodiment, the hardness rating is selected for the sizes and types of particulate matter expected in the fluid flow. In one application involving a sand and sediment contaminated flow of water, tubing formed of a synthetic rubber, marketed under the name VITON and having a durometer hardness rating in the range of 60–90 was found acceptable. Proper selection of the material and hardness rating assures that the tubing means will adequately surround and encapsulate particles which may be carried by particular media flows, and that an undue amount of force or pressure will not be required to collapse the tubing.

Devices which utilize the present invention may further comprise means responsive to an increase in temperature for automatically returning the tubing means to an uncollapsed state to allow fluid to flow from the chamber through the outlet means when the temperature of the device increases beyond a predetermined value. The means responsive to an increase in temperature may incorporate a metal (or other material) having a relatively low melting point which corresponds to the selected predetermined value. In one embodiment of the invention, the means for selectively collapsing the tubing means includes a movably mounted member disposed adjacent the tubing means, biasing means for urging the member against the tubing means to collapse the tubing and block the flow of fluid from the chamber, and means for selectively moving the member against the biasing means and away from the tubing means to allow the tube to return to an uncollapsed state so that fluid may flow from the chamber through the outlet means. In this embodiment, the low melting point metal forms a supporting base for the biasing means (e.g., a coil spring) such that when the temperature of the device increases beyond the predetermined value, the supporting base for the biasing means melts and the biasing means sinks into the base and ceases to urge the member against the tubing means. This allows the tubing to return to the uncollapsed state so that fluid may flow from the chamber through the associated outlet.

Other objects, advantages and novel features of the present invention will become apparent from the following detailed description of the invention when considered in conjunction with the accompanying drawings.

DETAILED DESCRIPTION OF THE DRAWINGS

Figure 1:
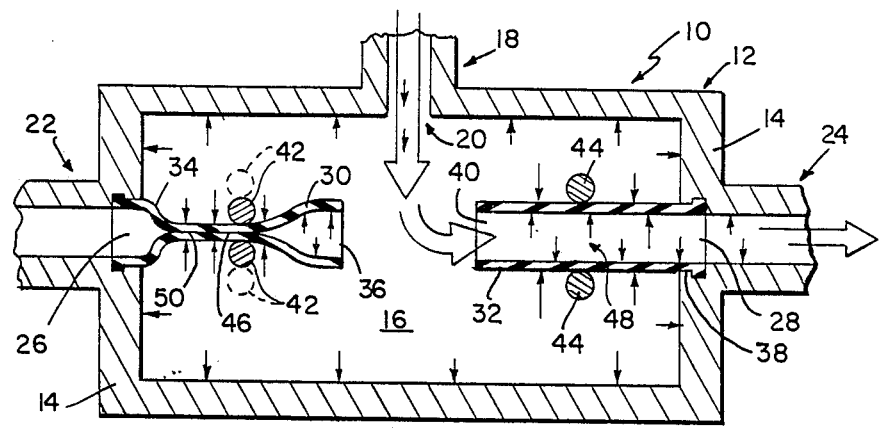
FIG. 1 shows a schematic representation of a valve constructed in accordance with the present invention.

FIG. 1 shows a schematic representation of a valve 10 constructed in accordance with the present invention. Valve 10 includes a valve body 12 which has side walls 14 which define a fluid holding chamber 16 which receives a flow of pressurized fluid from an inlet 18. Inlet 18 is adapted for connecting valve 10 to an upstream source of pressurized fluid (not shown) and, thus, is preferably provided with threads or other appropriate means for connecting to a nipple, union, or other appropriate hardware. Inlet 18 has a downstream end 20 which opens into chamber 16 to complete the connection between the upstream source of pressurized fluid and fluid holding chamber 16.

The embodiment of valve 10 illustrated in FIG. 1 is further provided with outlets 22 and 24 which, for purposes of illustration only, are shown on opposite sides of valve body 12. As with inlet 18, outlets 22 and 24 are provided with nipples, unions, or other appropriate hardware (not shown) to facilitate connection to a downstream device. Outlets 22 and 24 may be connected to a variety of downstream devices, including sprinkler heads, plumbing fixtures, wash-down hoses, or other manually or automatically operated valves. Valve 10 may also be used as a pilot control valve, in which case outlets 22 and 24 may be connected to the pilot or control inputs of other valves or similar devices.

Outlets 22 and 24 include respective outlet openings 26 and 28 in side walls 14. Sealingly attached or connected to these outlet openings are lengths of collapsible tubing 30 and 32. Specifically, tubing 30 is connected at its first end 34 around outlet opening 26, and extends from outlet opening 26 into chamber 16. Second end 36 of tubing 30 opens into valve chamber 16 to allow for entry of pressurized fluid. Similarly, tubing 32 has a first end 38 which is sealingly connected or attached around outlet opening 28, and extends from outlet 28 into valve chamber 16. Second end 40 of tubing 32 opens into valve chamber 16 to admit the high pressure fluid, as indicated by the open arrows in FIG. 1.

The remaining components of valve 10, as illustrated in FIG. 1, are schematically illustrated mechanical devices 42 and 44 which are disposed adjacent locations 46 and 48 of tubings 30 and 32, respectively, and which are used for collapsing tubings 30 and 32 at these locations. Tubing 30 is shown in a collapsed or closed state, while tubing 32 is shown in an uncollapsed or opened state. Mechanical devices 42 and 44 may be cam operated mechanical members (as illustrated below in connection with the embodiment shown in FIGS. 2 and 3) or, alternatively, may employ any other suitable means for collapsing the tubing at locations 46 and 48, including electrical solenoids, hydraulic and/or pneumatic operators, or other appropriate mechanical devices. Tubings 30 and 32 are formed of a relatively soft synthetic or natural rubber (or functionally equivalent material) having a durometer hardness rating selected for the sizes and types of particles expected in the fluid flow. In a particular application involving a flow of water contaminated with sand and sediments, tubing formed of the synthetic rubber VITON having a durometer rating of 60–90 was found to provide acceptable results. Proper selection of tubing type and hardness assures that the tubing is relatively easy to collapse at the specified locations.

As indicated by the closed arrows in FIG. 1, an equal pressure acts on both the inner and outer surfaces of the tubing (i.e., tubing 32) in its uncollapsed state. However, when the tubing is collapsed, for example, at location 46 by device 42, the pressure inside the tube downstream of location 46 decreases. The pressure of the fluid in chamber 16 acts on the outer surface of tubing 30 between location 46 and side wall 14 to further collapse this portion of the tube. Thus, a relatively large sealing area 50 is provided by the combined action of device 42 and the pressure of the fluid in fluid chamber 16. Since the tubing durometer rating of the tubing can be chosen to assure that the tubing is relatively soft, particles of sand, sediments, or other contaminants in sealed area 50 will be enclosed and encapsulated by the tubing, enabling the valve to completely shut off the flow, notwithstanding the presence of these particles. If necessary, a bleed valve is connected in the downstream circuit (i.e., downstream of opening 26) to assure that pressure is not trapped in the downstream circuit, and that the portion of tubing 30 between location 46 and side wall 14 will be collapsed by the fluid pressure when the pressure in the downstream circuit decreases substantially below that of the fluid in chamber 16.

It should be noted that when the tubing is in the uncollapsed condition, there is equal pressure on both the inner and outer surfaces of the tube. Consequently, regardless of the pressure that is applied to the inside of chamber 16, the force required to collapse the tubing at locations 46 and 48 remains constant. This is the same force that would be required to collapse the tubing in an unpressurized environment. Since all portions of the tube are wholly contained within valve chamber 16, and the tubing is never required to contain the pressure in the chamber, the pressure rating of the tubing is not critical.

Although the valve illustrated in FIG. 1 is shown with a single inlet 18, additional inlets may be provided, if desired. Similarly, a single outlet or three or more outlets may be provided as alternatives to the two-outlet configuration shown.

Figure 2:
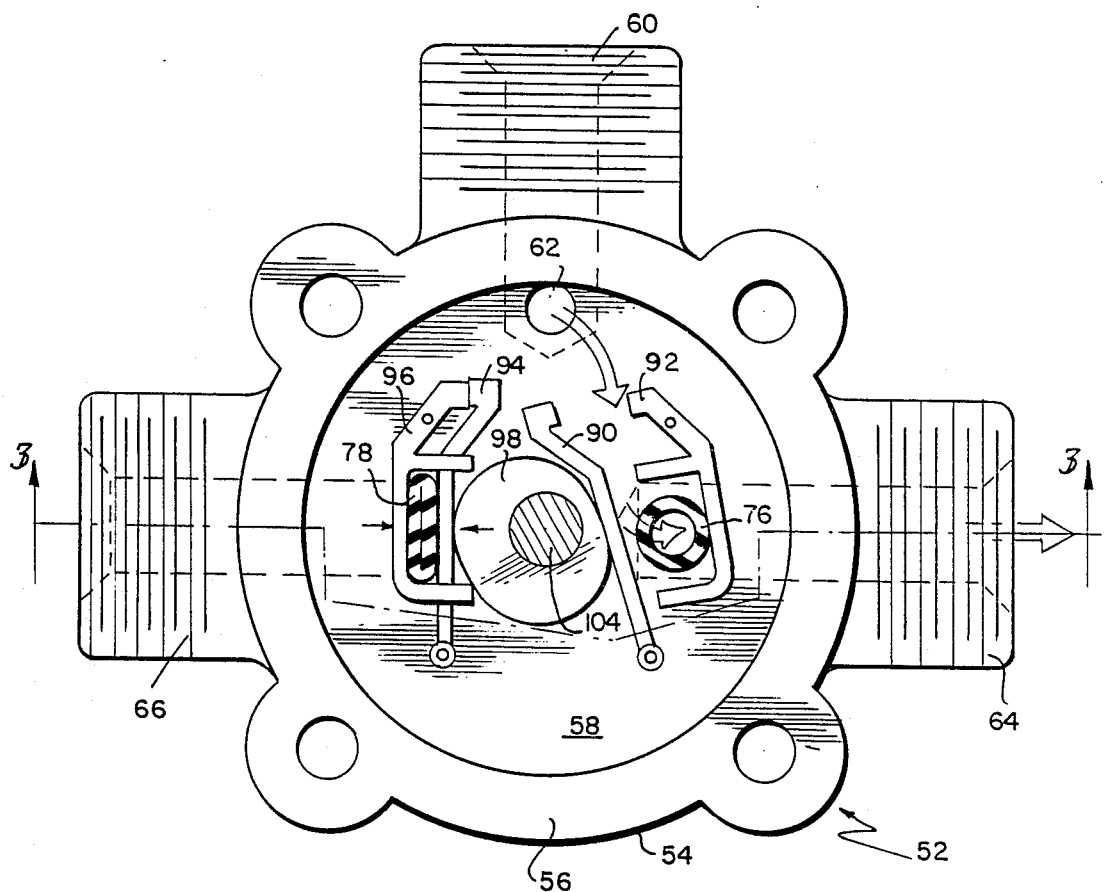
FIG. 2 shows a top view (with top cover removed) of an embodiment of a valve constructed in accordance with the present invention.
Figure 3:
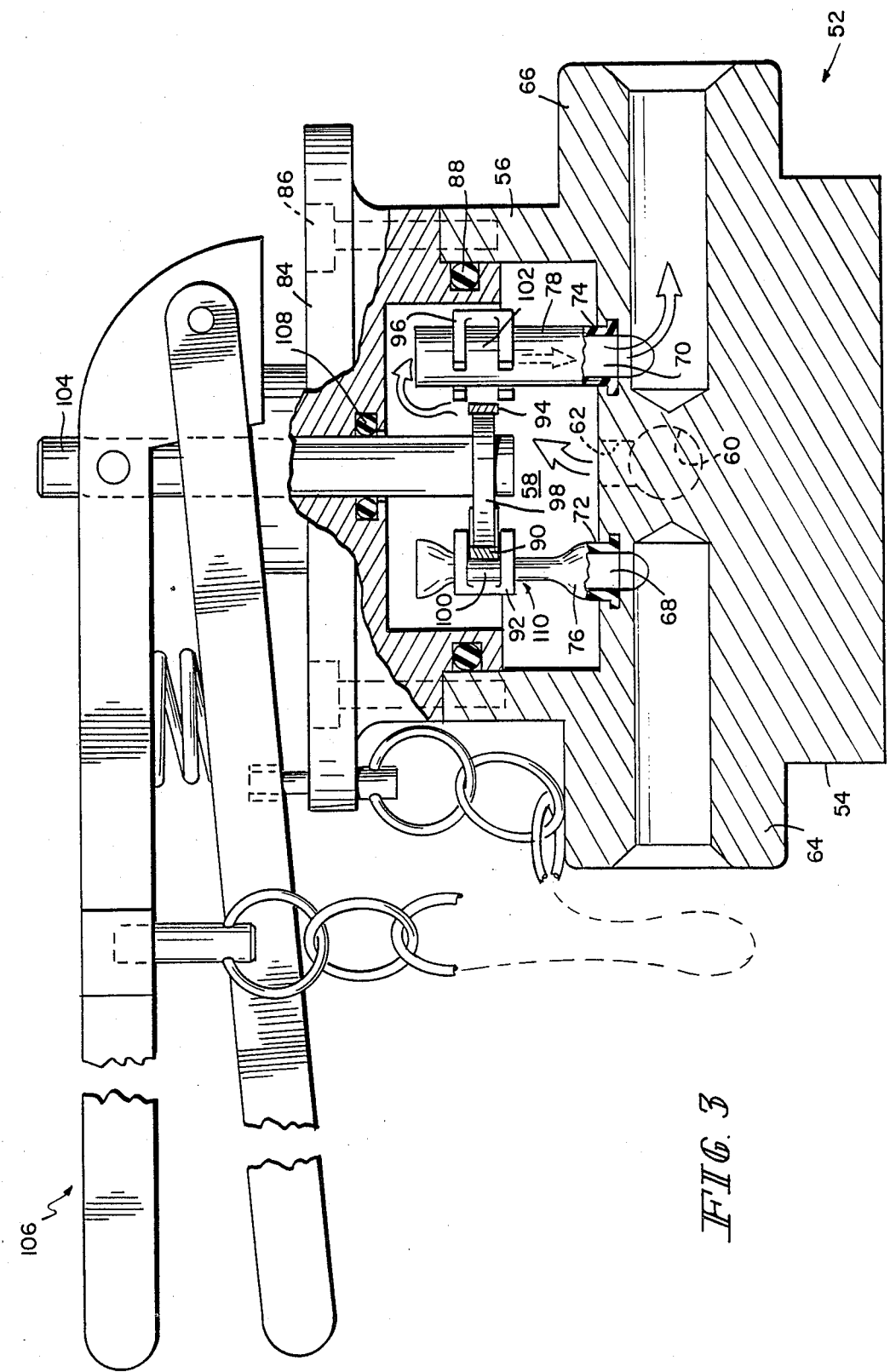
FIG. 3 shows a side view, in partial cross-section, of the embodiment of the valve of FIG. 2, taken along line 3—3 of FIG. 2.

FIG. 2 shows a top view (with top cover removed) of valve 52 which is constructed in accordance with the present invention. FIG. 3 shows a side view, in partial crosssection, of this same valve with top cover and operating handle in place. Valve 52 includes a valve body 54 having side walls 56 which define a fluid holding valve chamber 58. A single inlet 60 is provided for connecting fluid holding chamber 58 to an upstream source of pressurized fluid. Inlet 60 has a downstream end 62 which opens into chamber 58.

Valve 52 is further provided with outlets 64 and 66 which are adapted for connection to downstream devices. With reference to FIG. 3, outlets 64 and 66 have upstream ends 68 and 70 which open into chamber 58 and which are sealingly connected to first ends 72 and 74, respectively, of collapsible tubing lengths 76 and 78. Tubing lengths 76 and 78 extend from openings 68 and 70 into valve chamber 58 which is defined by side walls 56 and cover 84 of valve body 54. Cover 84 is attached to side walls 56 by bolts 86, and a seal is effected between side walls 56 and cover 86 by O-ring 88.

Referring to FIGS. 2 and 3, a pair of pivotally mounted closure members 90, 92 and 94, 96 are provided on opposing sides of tubing lengths 76 and 78, respectively. Closure members 90, 92 and 94, 96 are operated by camming device 98 to collapse tubing lengths 76 and 78 at locations 100 and 102 (FIG. 3), either individually or simultaneously (i.e., simultaneously collapsed or uncollapsed), as desired. For purposes of illustration only, tubing length 76 is shown in the collapsed state, while tubing length 78 is shown in the uncollapsed state. As illustrated in FIG. 3, cam 98 is controlled by a shaft 104 and handle 106 mechanism. Shaft 104 extends through cover 84 and is sealed appropriately by O-ring 108.

Referring again to FIG. 3, when tubing length 76 is collapsed at location 100 by the action of cam 98 and closure members 92, 90, the pressure of the fluid within chamber 58 further collapses that portion of tubing length 76 between location 100 and outlet opening 68, which portion is generally indicated by reference numeral 110. Tubing lengths 76 and 78 (and portion 110) can be as long as necessary to provide for an effective and total shut-off of the outlets by the action of cam 98 and the fluid pressure on portion 110 of the collapsible tubing. This arrangement prevents valve leakage or valve clogging, notwithstanding the presence of various types and sizes of contaminants in the fluid flow which is controlled by the valve.

Figure 4:
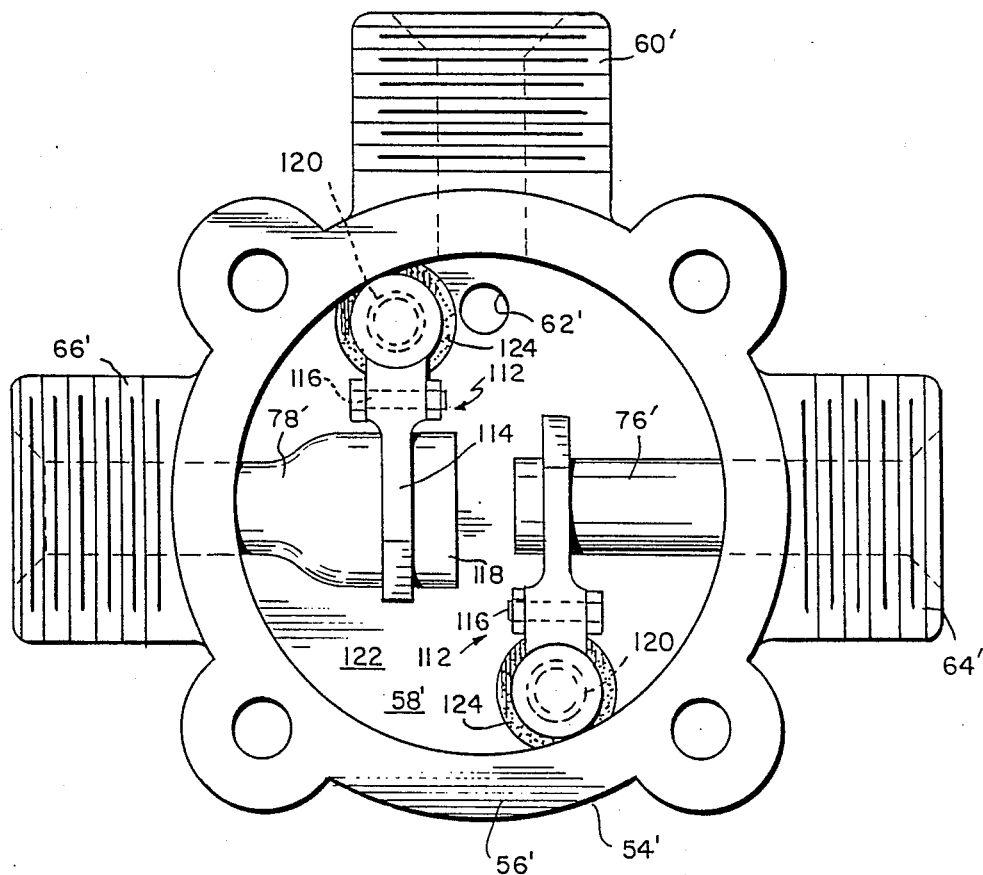
FIG. 4 shows a top view (with top cover removed) of an alternative embodiment of a valve constructed in accordance with the present invention.

FIG. 4 shows a top view of an alternative embodiment of the valve of FIGS. 2 and 3. For ease of reference, substantially identical structures in FIGS. 2 and 4 are identified by like reference numerals, with the addition of a prime designation to the numerals of FIG. 4.

Figure 5:
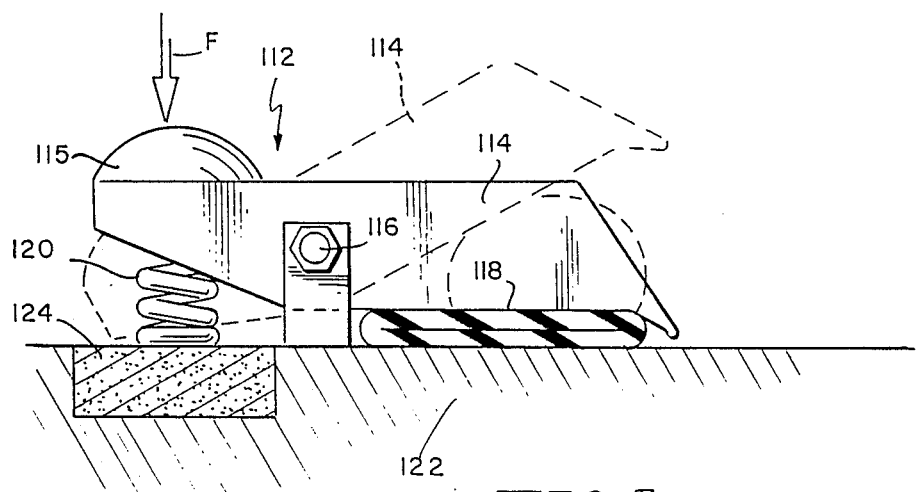
FIG. 5 shows a close-up view of a portion of the alternative embodiment shown in FIG. 4.

The primary distinctions between the embodiment of FIG. 4 and that of FIGS. 2 and 3 is the mechanism 112 used in the embodiment of FIG. 4 to collapse collapsible tubing lengths 76' and 78'. Mechanism 112 is schematically illustrated in FIG. 5. Mechanism 112 comprises an arm 114 which is pivotally mounted near its center point at 116. On one side of pivot 116, arm 114 extends over and adjacent the collapsible tubing, which is identified by reference numeral 118 in FIG. 5. On the other side of pivot 116, the other end 115 of arm 114 is biased upwardly by the action of a biasing member which, in this embodiment, comprises coil spring 120. The action of spring 120 urges arm 114 in a clockwise direction around pivot 116 which will cause the collapse of tubing 118 by squeezing the tubing between arm 114 and underlying support 122. When tubing 118 is collapsed, the associated outlet of the valve is considered "closed". To open the valve, a force F is applied as indicated to the portion of arm 114 immediately above spring 120 (i.e., end 115 of arm 114), compressing the spring and raising the portion of arm 114 which lies adjacent tubing 118. When arm 114 is raised, the pressure of the fluid within chamber 58' causes tube 118 to return to the uncollapsed state, thus opening the associated outlet of the valve.

An additional feature of the embodiment illustrated in FIGS. 4 and 5 (which may also be incorporated in other embodiments of the invention) relates to an arrangement which will allow the outlets of the valve to be opened "automatically" in the event the temperature of the valve increases beyond a selected, predetermined value. This arrangement is especially well-suited for applications in which the valve is to be used in a fire warning or fire control system. It involves the use of a block of low temperature melting point metal 124 as a supporting base for spring 120. If, for instance, the location of the valve is engulfed in flames and the valve cannot be manually, electrically, or otherwise activated, an increase in the temperature of valve body 54' will cause metal base 124 to soften and melt, allowing spring 120 to sink into base 124 causing tubing 118 to revert to the uncollapsed state.

The particular material used for base 124 can be selected so as to allow for such "automatic" operation to occur when the temperature of the valve body reaches or exceeds a predetermined value. This particular aspect of the invention is not intended to be limited to the particular configuration of components illustrated in FIG. 5, but can be incorporated into other embodiments, as well. A similar feature could, for example, be incorporated into the embodiment shown in FIGS. 2 and 3 above, or in alternative configurations. However, the arrangement shown in FIG. 5, and particularly the use of a low melting point metal to "trigger" the automatic operation of the valve, are preferred features of the invention and are thought to offer advantages over other possible designs.

It should be noted that Force F may be generated by mechanical, electrical, hydraulic, or other means.

The terms "fluid" or "fluids" and "medium" or "media" are used interchangeably in this application to refer to the material(s) (in gaseous, liquid or solid form) which constitute a flow to be controlled by a device which incorporates the present invention. Although certain aspects and embodiments of the invention are particularly well-suited for controlling a flow which is a combination of a liquid or gaseous carrier and solid particulate matter, the subject invention is not necessarily limited to this application. Similarly, although many devices which may incorporate the present invention are termed "valves," the principles of the invention may find application in other devices, as well. Accordingly, the use of such terms (i.e., fluid(s), valve(s), etc.) in either the description or claims is not intended to limit the scope of the present invention.

From the preceding description of the preferred embodiments, it is evident that the objects of the invention are attained. Although the invention has been described and illustrated in detail, it is to be clearly understood that the same is intended by way of illustration and example only and is not to be taken by way of limitation. The spirit and scope of the invention are to be limited only by the terms of the appended claims.

What is claimed is:

1. A flow control device, comprising:
    a body having sidewalls which define a fluid-holding chamber;
    inlet means opening into the chamber for supplying a fluid flow into the chamber under a positive pressure;
    outlet means opening into the chamber and including an outlet opening in the body;
    collapsible tubing means having one end sealingly attached to the outlet opening and having a free and open opposite end extending into the chamber; and
    means for selectively collapsing and uncollapsing said tubing means at a first point to block and unblock the flow of fluid from the chamber through the outlet means, wherein a decrease in the downstream pressure of fluid in the tubing means causes the fluid pressure within the chamber to positively compress the tubing means downstream of said first point adjacent said one end.

2. A device according to claim 1, wherein said means for collapsing said tubing means comprises mechanical means disposed adjacent said tubing means at a first location spaced apart from the sidewalls of the chamber.

3. A device according to claim 2, wherein said means for collapsing said tubing means further comprises said positive pressure exerted by the fluid on a portion of an outer surface of said tubing means between said first location and the sidewall of the chamber.

4. A device according to claim 2, wherein said mechanical means comprises a camming device and means extending into the chamber for operating the camming device to collapse said tubing means.

5. A device according to claim 4, wherein said outlet means comprises at least two outlets, each having collapsible tubing means attached thereto, and wherein said tubing means are commonly collapsed by operation of said camming device.

6. A device according to claim 4, wherein said mechanical means further comprises a pair of closure members oppositely disposed on either side of said tubing means, at least one of said members being movably mounted and situated adjacent a camming surface of the camming device and cooperating with said device to collapse said tubing means when the camming device is operated.

7. A device according to claim 1, wherein said means for uncollapsing said tubing means comprises said positive pressure exerted by the fluid on an inner surface of said tubing means.

8. A device according to claim 1, wherein said tubing means comprises a tubing having a durometer hardness rating selected on the basis of at least one characteristic of a fluid controlled by the device.

9. A device according to claim 1, wherein said tubing means is formed from a material having a durometer hardness rating selected on the basis of at least one characteristic of particulate matter expected in a fluid flow controlled by the device.

10. A device according to claim 1, further comprising means responsive to an increase in temperature for automatically returning said tubing means to an uncollapsed state to allow fluid to flow from the chamber through said outlet means when the temperature of the valve increases beyond a predetermined value.

11. A device according to claim 10, wherein said means responsive to an increase in temperature comprises metal having a relatively low melting point which corresponds to said predetermined value.

12. A device according to claim 11, wherein said means for selectively collapsing said tubing means includes a movably mounted member disposed adjacent said tubing means, biasing means for urging said member against said tubing means to collapse the tubing means and block the flow of fluid from the chamber through the outlet means, and means for selectively moving said member away from said tubing means to allow the tube to return to an uncollapsed state which allows fluid to flow from the chamber through the outlet means.

13. A device according to claim 12, wherein said metal forms a supporting base for said biasing means such that when the temperature of the valve increases beyond the predetermined value, said biasing means ceases to urge the member against said tubing means, allowing the tubing to return to the uncollapsed state to allow fluid to flow from the chamber through the outlet means.

14. A control valve for selectively connecting an upstream source of high-pressure fluid to a downstream device, comprising:
    a valve body having sidewalls which define a fluid-holding chamber;
    inlet means for connecting the chamber to the upstream fluid source;
    outlet means for connecting the chamber to the downstream device, said outlet means comprising an outlet opening in the valve body and a length of collapsible tubing having a first end sealingly connected to the valve body around the outlet opening and extending into the chamber, free and having a second end open in said chamber to admit the high-pressure fluid; and
    means for selectively collapsing at least a portion of said tubing at a first point to block the flow of fluid from the chamber to the downstream device, wherein a decrease in the downstream pressure of fluid in the tubing causes the high-pressure fluid within the chamber to positively compress the tubing downstream of said first point adjacent said first end.

15. A control valve according to claim 14, wherein said means for collapsing said tubing comprises mechanical means disposed adjacent said tubing at a first location between said first and second ends, and means for operating said mechanical means to collapse the tubing at said first location, allowing the pressure of the fluid to collapse that portion of the tubing between said first location and said first end.

16. A control valve according to claim 14, further comprising means responsive to an increase in temperature for returning said tubing to an uncollapsed state to allow fluid to flow from the chamber to the downstream device when the temperature of the valve body increases to a predetermined value.

17. A control valve according to claim 16, wherein said means responsive to an increase in temperature comprises metal having a relatively low melting point which corresponds to said predetermined value.

18. A control valve according to claim 17, wherein said means for selectively collapsing said tubing includes a movably mounted member disposed adjacent said tubing, biasing means for urging said member against said tubing to collapse the tubing and block the flow of fluid from the chamber through the outlet means, and means for selectively moving said member away from said tubing to allow the tube to return to an uncollapsed state which allows fluid to flow from the chamber through the outlet means.

19. A control valve according to claim 18, wherein said metal forms a supporting base for said biasing means such that when the temperature of the valve increases beyond the predetermined value, said biasing means ceases to urge the member against said tubing, allowing the tubing to return to the uncollapsed state to allow fluid to flow from the chamber through the outlet means.

20. A control valve according to claim 14, further comprising means for uncollapsing said tubing to unblock the flow of fluid from the chamber to the downstream device, said means including at least the pressure of the fluid supplied from the upstream source.

21. A control valve according to claim 14, wherein said collapsible tubing is formed from a material having a durometer hardness rating selected on the basis of at least one characteristic of a fluid flow controlled by the device.

22. A control valve according to claim 14, wherein said collapsible tubing is formed from a material having a durometer hardness rating selected on the basis of at least one characteristic of particulate matter expected in a fluid flow controlled by the device.

* * * * *